June 30, 1964     K. V. BECKER     3,138,810
HEEL END ASSEMBLING AND BACK PART MOLDING MACHINES
Filed Jan. 26, 1962     12 Sheets-Sheet 1

Fig. 1

Inventor
Karl V. Becker
By his Attorney

June 30, 1964 K. V. BECKER 3,138,810
HEEL END ASSEMBLING AND BACK PART MOLDING MACHINES
Filed Jan. 26, 1962 12 Sheets-Sheet 2

June 30, 1964 K. V. BECKER 3,138,810
HEEL END ASSEMBLING AND BACK PART MOLDING MACHINES
Filed Jan. 26, 1962 12 Sheets-Sheet 5

June 30, 1964     K. V. BECKER     3,138,810
HEEL END ASSEMBLING AND BACK PART MOLDING MACHINES
Filed Jan. 26, 1962     12 Sheets-Sheet 8

June 30, 1964  K. V. BECKER  3,138,810
HEEL END ASSEMBLING AND BACK PART MOLDING MACHINES
Filed Jan. 26, 1962  12 Sheets-Sheet 11

United States Patent Office 3,138,810
Patented June 30, 1964

3,138,810
HEEL END ASSEMBLING AND BACK PART MOLDING MACHINES
Karl V. Becker, Boxford, Mass., assignor to United Shoe Machinery Corporation, Boston, Mass., a corporation of New Jersey
Filed Jan. 26, 1962, Ser. No. 168,918
16 Claims. (Cl. 12—12.3)

This invention relates to shoe machine and is herein illustrated in its application to machines for assembling shoe upper parts on their lasts and molding the back parts or heel end portions of the upper materials upon the heel end portion of the last. A machine of this type is disclosed in an application for United States Letters Patent, Serial No. 144,635, filed October 12, 1961, in the name of Adelbert W. Rockwell, Jr., now Patent No. 3,096,531.

In the manufacture of shoes according to practices which contemplate the performance of a back part molding operation, the usual procedure has been to mold the back part before the shoe upper materials are mounted on the last and then in an operation distinct and separate from the molding operation to assemble the shoe upper materials upon the last on which the shoe is to be made.

It is an object of the present invention to provide an improved machine of the type disclosed in the Rockwell application above referred to which will mold the back parts of shoe upper materials to the heel end portion of the last on which the shoe is to be made and fasten the bottom margins of the upper materials to an insole on the last bottom. It is a further object of the invention to provide in one station of such a machine improved means for heat treating a thermoplastic stiffener incorporated in a shoe upper thereby to render the stiffener flaccid for the duration of a back part molding operation performed in another station of the machine.

With the above and other objects in view as will hereinafter appear, the present invention, in one aspect thereof, contemplates the provision in one station of a shoe machine of a heated shoe form for rendering flaccid a thermoplastic stiffener assembled with shoe upper materials. A suitable end embracing band operating in conjunction with the heated form insures intimate contact of the upper materials therewith. In a second station the machine is provided with a band for clamping against a shoe last the upper materials including the thermoplastic stiffener which has been rendered flaccid by the heated form. Incorporated in the band in the second station is suitable means for conducting heat from the stiffener thereby to permit the stiffener to set to the shape of the last. Also incorporated in the second station is means operating automatically to cause the band in the first station to be disengaged from the shoe upper materials mounted on the heated shoe form preparatory to the removal of the upper materials from the heated form and their assembly on the last on which the upper is to be shaped. For insuring the clamping of the end portion of the upper in smooth and wrinkle free condition on the heated shoe form the invention provides means herein illustrated as a toe gripper for tensioning the upper about the heated shoe form. The gripping means is released at the proper time by the operation of the means in the second station for causing the band to be disengaged from the heated shoe form.

For shaping an end portion of a shoe upper on its last the present invention contemplates the provision of a pair of lasting wipers mutually articulated for angular movement relatively to an end portion of the last. Mounted for movement with the wipers is a fastening inserting means for securing a lasted marginal portion of the upper to an insole on the last bottom, said fastener inserting means including a driver and a nozzle through which the driver operates, said nozzle extending through a bore in the wipers at the axis of their angular movement. The illustrated nozzle is so arranged that its lower extremity lies substantially in the plane of the wiper and provides a part of the wiping means.

For cooperating with the wiping means for shaping an end portion of an upper upon its last, the invention provides end embracing means in the form of a flexible elastic band having a portion of relatively high resiliency constructed and arranged to engage the extremity of an end portion of the upper, and portions of relatively low resiliency arranged to engage opposite sides of said end portions of the upper, said band being deformable by the application thereto of a force in the direction of the length of an upper in the machine. A suitable actuating means advances the band to shape the end portion of the upper upon the last. In the operation of the machine said band is advanced into engagement with the supported upper causing deformation of the portion of high resiliency with consequent upper tensioning movement of the side portions of the band endwise of the upper, the extent of such endwise movement being proportional to the degree of deformation of said portion of high resiliency. The alternative end embracing assembly comprises an end embracing band molded to a shape substantially complemental to the shape of a shoe form or last and characterized by its elasticity, and means for stretching the band about an end portion of a shoe upper thereby to shape the upper upon a suitable form or last, suitable means being provided for limiting the stretching action of the band. The extent of the stretching action of the band is determined by a flexible but inextensible band extending about the elastic band and secured thereto at its extremities but normally spaced therefrom at its central section. For effecting the upper shaping operation a suitable actuating means is connected to the elastic band and to the inextensible band, said actuating means being operable to advance the elastic band into upper shaping position and to stretch it about the end portion of the upper to a limit determined by the engagement of the inextensible band with the central portion of the elastic band.

In its application to the combination of the wiping means and the fastening inserting means the present invention consists in the combination with a tack driver member of means, herein illustrated as a raceway, for directing a line of tacks to a transfer point and a member for transferring a tack from the transfer point through a suitable passage into driving position relatively to the driver member, the transfer member being constructed so as to retain the tack in driving position preparatory to the operation of the driver member and being characterized by the formation therein of a cam surface for engaging the bottom surface of the head of a tack next in line to the tack at the transfer point thereby to elevate said next in line tack during the advancement of the transfer member and thus insuring the movement of said tack into the transfer point in the next cycle of the machine and obviating the possible failure of the tack to advance into the transfer point by reason of the engagement of the head of the tack with a wall of the passage from the transfer point to the tack driving position.

These and other features of the invention will now be described with reference to the accompanying drawings and pointed out in the appended claims.

Figure 1:
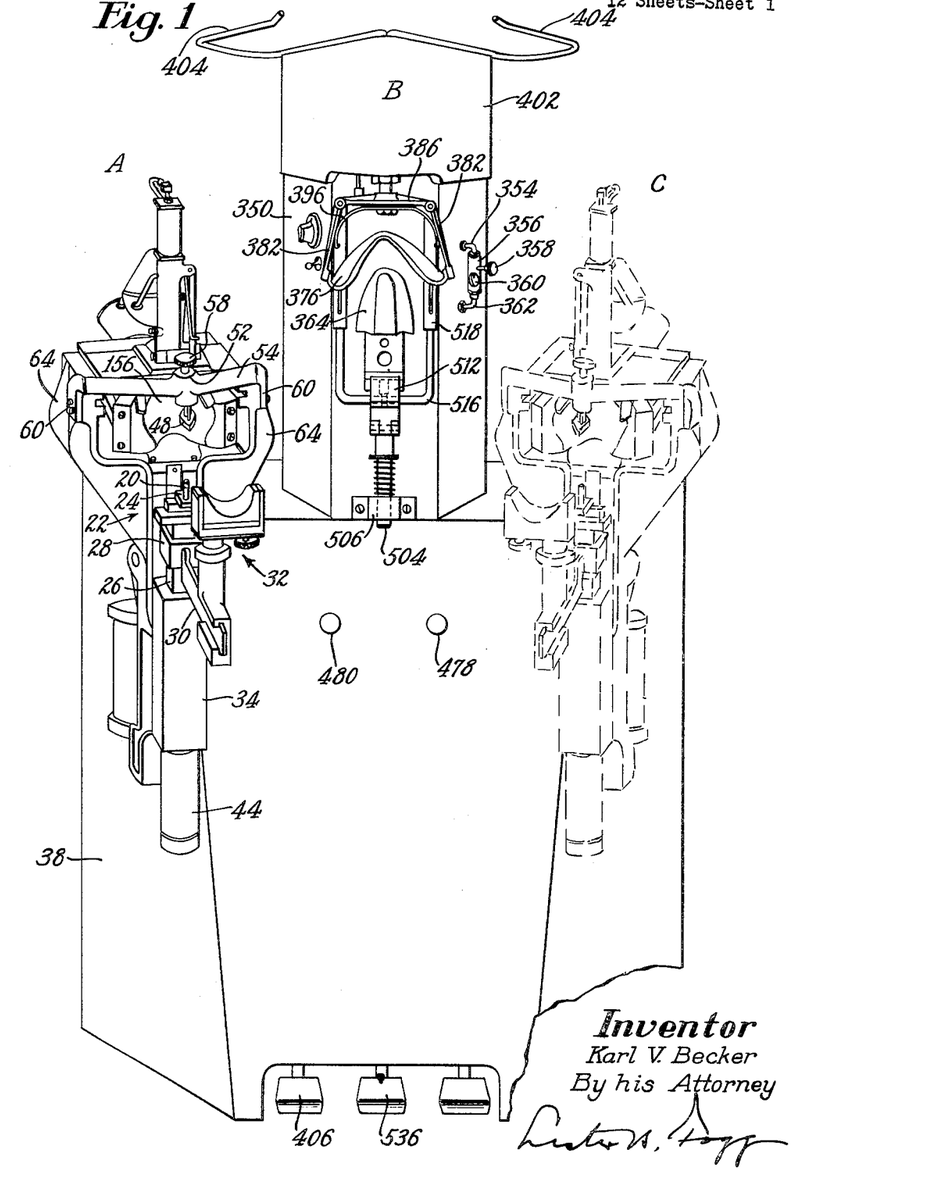
FIG. 1 is a front elevation illustrating a three station machine embodying the features of the present invention.

Referring to FIG. 1, the invention is illustrated as embodied in a three station machine for assembling shoe uppers on their lasts and shaping the heel end portions of the shoe upper materials, the illustrated machine being of the type disclosed in the Rockwell application hereinbefore referred to. Inasmuch as the organization in station C is substantially identical to the organization in station A, it will be understood that the following description of the organization illustrated in station A applies equally well to the opposite station.

Figure 2:
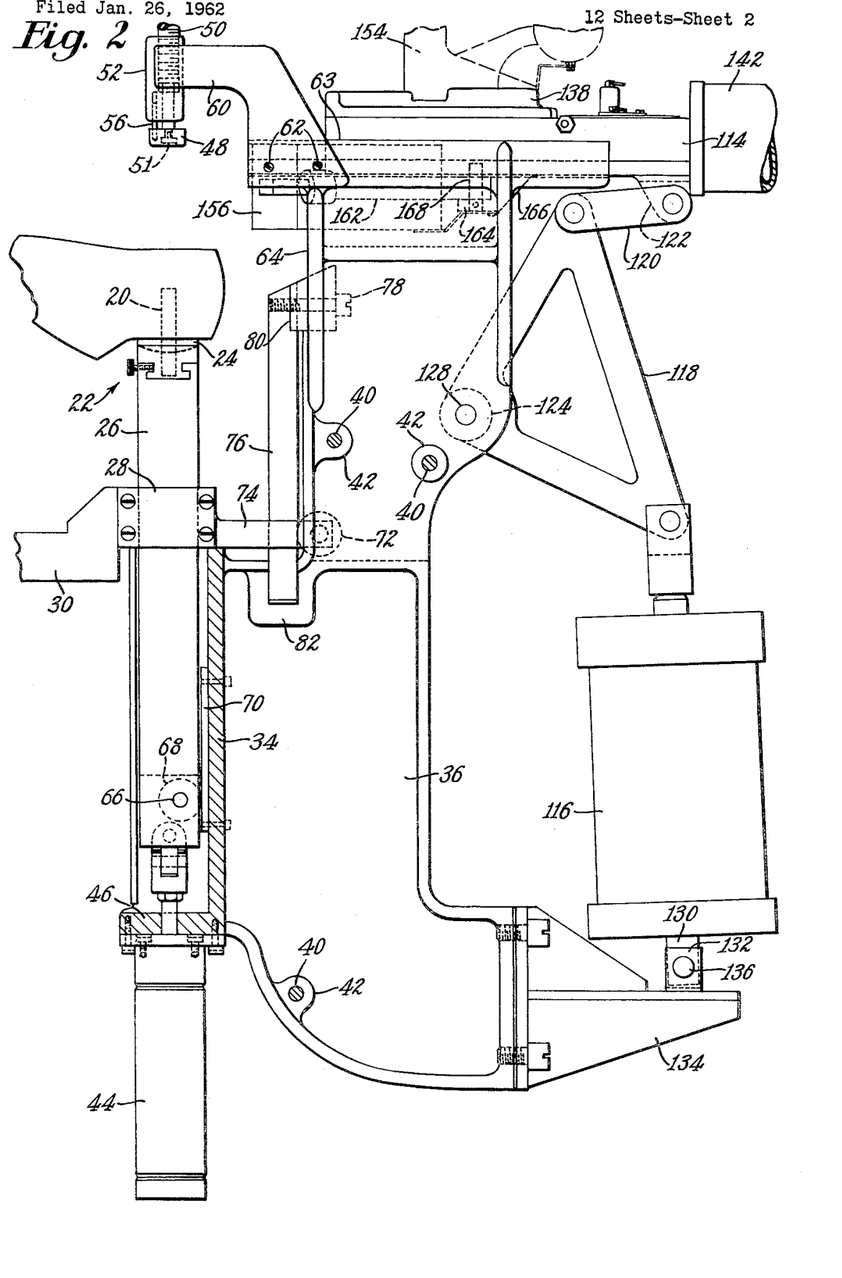
FIG. 2 is an enlarged side elevation partly in section illustrating certain features of the organization in station A of FIG. 1.

Referring to FIGS. 1 and 2, a last pin 20 is arranged to receive the heel end portion of an inverted shoe last having shoe upper parts assembled thereon, the last and the shoe upper parts being hereinafter referred for convenience of description as a shoe. The last pin is incorporated in an assembly 22 which permits angular movement of the last pin widthwise and lengthwise of the last for angular adjustment of the last to the operating instrumentalities of the machine. The last is supported against downward movement by a plate 24 incorporated in the assembly 22. For a detailed description of the construction and operation of the last pin assembly reference may be had to United States Letters Patent No. 2,268,597 granted January 6, 1942, on an application filed in the name of Jacob C. Jorgensen. The last pin is carried at the upper end of a vertical jack member 26 which is substantially square in cross section. Secured to the jack member by clamping plates 28 (FIG. 2) is a horizontal arm 30 on which a toe supporting assembly 32 (FIG. 1) is mounted for adjustment toward and from the last pin. Referring to FIG. 2 the jack member 26 extends downwardly into a vertical channel structure 34 and is supported in its rest position illustrated in FIG. 2 by the engagement of the plates 28 with the upper extremity of the channel structure. The channel structure is incorporated in a frame member 36 which is secured to the left side wall of a cabinet 38 (FIG. 1) by headed screws 40 (FIG. 2) extending through bosses 42 which so determine the space relation and angular disposition of the frame member 36 relatively to the cabinet 38 that the operating assembly in station A confronts an operator standing in front of the center of the cabinet. For moving the jack member 26 upwardly from its loading position illustrated in FIG. 2 into a position in which a shoe on the last pin is presented to the operating instrumentalities of the machine a piston (not shown) is mounted in a cylinder 44 secured to the base portion 46 of the channel structure 34. The extent of the upward movement of the jack member is adjustably determined by stop or a hold down member 48 swivelled on the reduced lower end portion of an adjusting screw 50 and retained thereon by a headed screw 51. The screw 50 has threaded engagement in a vertical cylindrical portion 52 (FIG. 1) of a cross head 54. The hold down member is held against rotation by a pilot pin 56 (FIG. 2) extending upwardly therefrom for sliding engagement in a bore formed in the cylindrical portion 52. A knob 58 is provided at the upper extremity of the screw 50 to facilitate vertical adjustment of the hold down member. To provide for the mounting of the cross head 54 arms 60 extend rearwardly and downwardly from its opposite end portions and are widened at their lower extremities for attachment by headed screws 62, to horizontal rails 63 formed at the upper extremities of angular structures 64 (FIG. 3) incorporated in the frame 36. For guiding the upward movement of the jack member 26 and for holding the shoe against toeward movement during the operation of the machine the illustrated organization is provided with mechanism now to be described. Mounted on a cross pin 66 in the bifurcated lower end portion of the jack member 26 is a roll 68 which is arranged to bear against a vertical rail 70 secured to the channel structure 34. For taking the toeward thrust against the shoe a roll 72 is mounted between arms 74 secured to and extending rearwardly from the plates 28. The roll 72 bears against a vertical rail 76 the upper end portion of which is secured by a screw 78 to a cross head 80 incorporated in the angular structures 64. The lower portion of the rail 76 is positioned between the arms 74 and the extremity of the lower portion is inserted between the walls of a groove formed in a boss 82 in the central portion of the frame 36. During the upward movement of the jack column 26 the roll 72 rides against the rail 76 and the roll 68 at the lower extremity of the jack column rides against the rail 70. During the back part molding and heel end wiping operations, the forward thrust exerted against a shoe on the last pin 20 is taken by the rail 76 and the resultant rearward force exerted against the lower portion of the jack column is taken by the rail 70.

Figure 4:
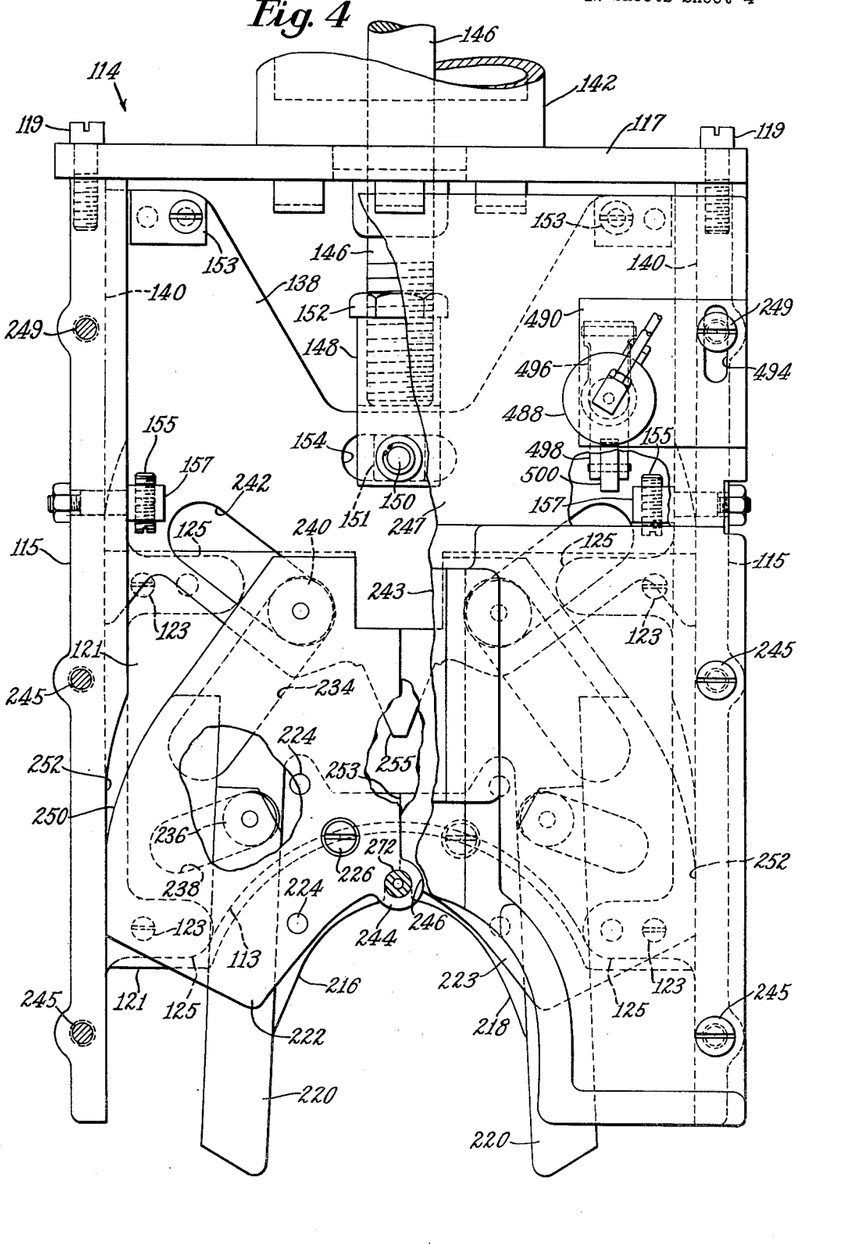
FIG. 4 is a plan view of the wiper organizaiton in station A, certain parts being broken away to illustrate underlying parts.

For mounting a heel band the illustrated machine is provided with a carriage illustrated in FIG. 4 and identified generally by the numeral 114. The illustrated carriage comprises two side members 115 interconnected by a base portion 113 (FIG. 12) and a rear member or cross head 117 secured to the side members by headed screws 119.

Figure 3:
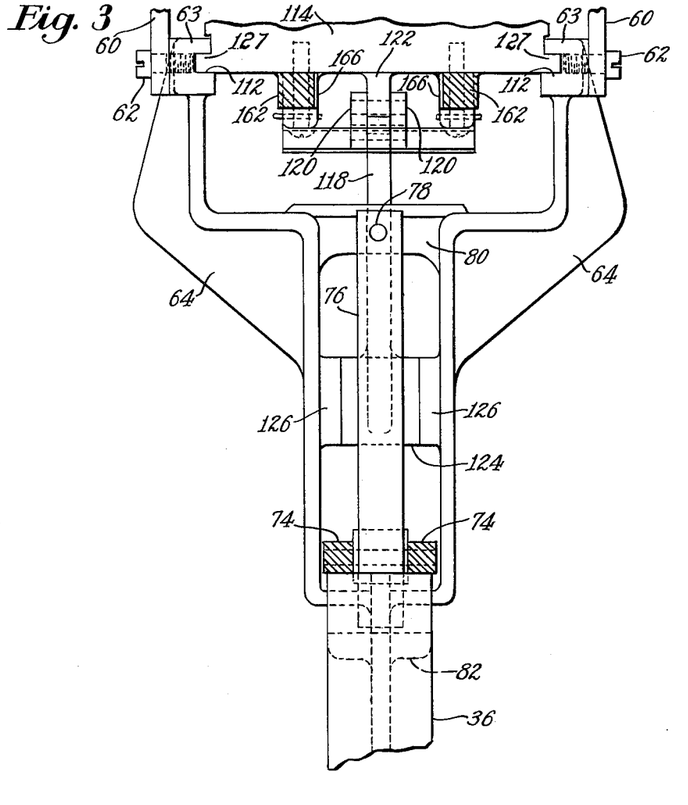
FIG. 3 is an enlarged view in front elevation illustrating certain features shown in FIG. 2.

To provide for the mounting of the heel band carriage 114 for movement toward and from the heel end portion of a shoe in its elevated or jacked position in the machine grooves 112 (FIG. 3) are formed in the horizontal rails 63 at the upper extremities of the angular structures 64, said grooves receiving flanges 127 extending outwardly from the heel band carriage. For imparting to the heel band carriage movements toward and from the heel end of the shoe a piston (not shown) is mounted in a cylinder 116 (FIG. 2) and is connected by a triangular lever 118 to links 120 pivotally connected to an ear 122 extending downwardly from the rear portion of the heel band carriage. Referring to FIG. 3 a hub 124 formed in the apex portion of the lever 118 is fitted between bosses 126 extending inwardly from the walls of the angular structure 64 and the lever 118 is fulcrumed on a cross pin 128 fixed in said bosses. In order to accommodate the angular movement of the cylinder 116 incidental to its operation, lugs 130 (FIG. 2) extend downwardly from the base of the cylinder into contiguous relation with upstanding portions of a yoke 132 fixed to a bracket 134 bolted to the frame structure 36 and a suitable fulcrum pin 136 extends through the yoke 132 and the lugs 130.

Referring to FIG. 4, a wiper actuating slide 138 is mounted in ways or grooves 140 in the heel band carriage 114 for horizontal movement relatively to the carriage toward and from the heel end portion of a last in the machine. The slide 138 actuates a lasting wiper assembly hereinafter described. For advancing and retracting the wiper slide, a double acting piston (not shown) is mounted in a cylinder 142 secured to the cross head 117 at the rear extremity of the heel band carriage 114. A piston rod 146 extends forwardly through a suitable opening in the cross head 117 and is threaded to receive the internally threaded tubular end portion of a coupling 148 connecting the piston rod to the wiper slide. The forward portion of the coupling is bifurcated to receive the slide, and a headed pin 150 connects the coupling 148 to a block 151 slidably mounted in a slot 154 in the slide. A hexagonal head 152 formed in the rear portion of the coupling facilitates adjustment thereof relatively to the piston rod. In FIG. 4 the wiper actuating slide 138 is shown at the limit of its rearward or retracting movement. The forward or advancing movement of the slide is terminated by the engagement of blocks 153 secured to the slide with adjustable stop screws 155 mounted, respectively, in the heads of bolts 157 secured to the heel band carriage 114.

Figure 6:
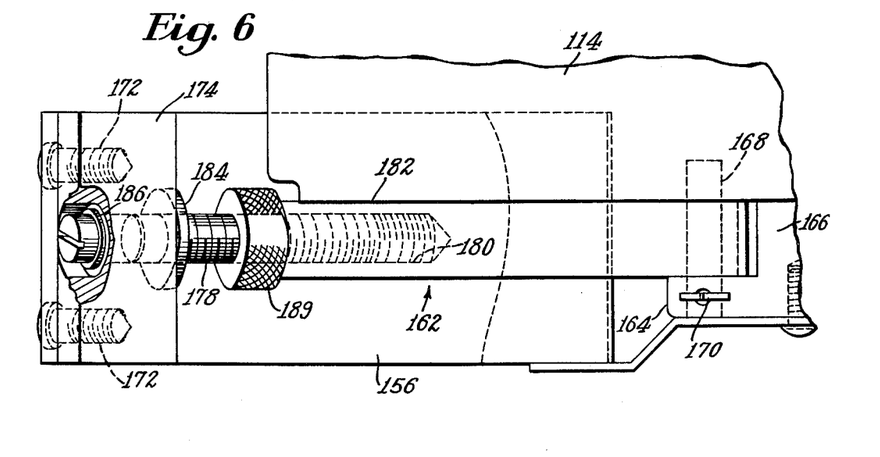
FIG. 6 is an enlarged view in right side elevation illustrating the heel band assembly in station A.
Figure 12:
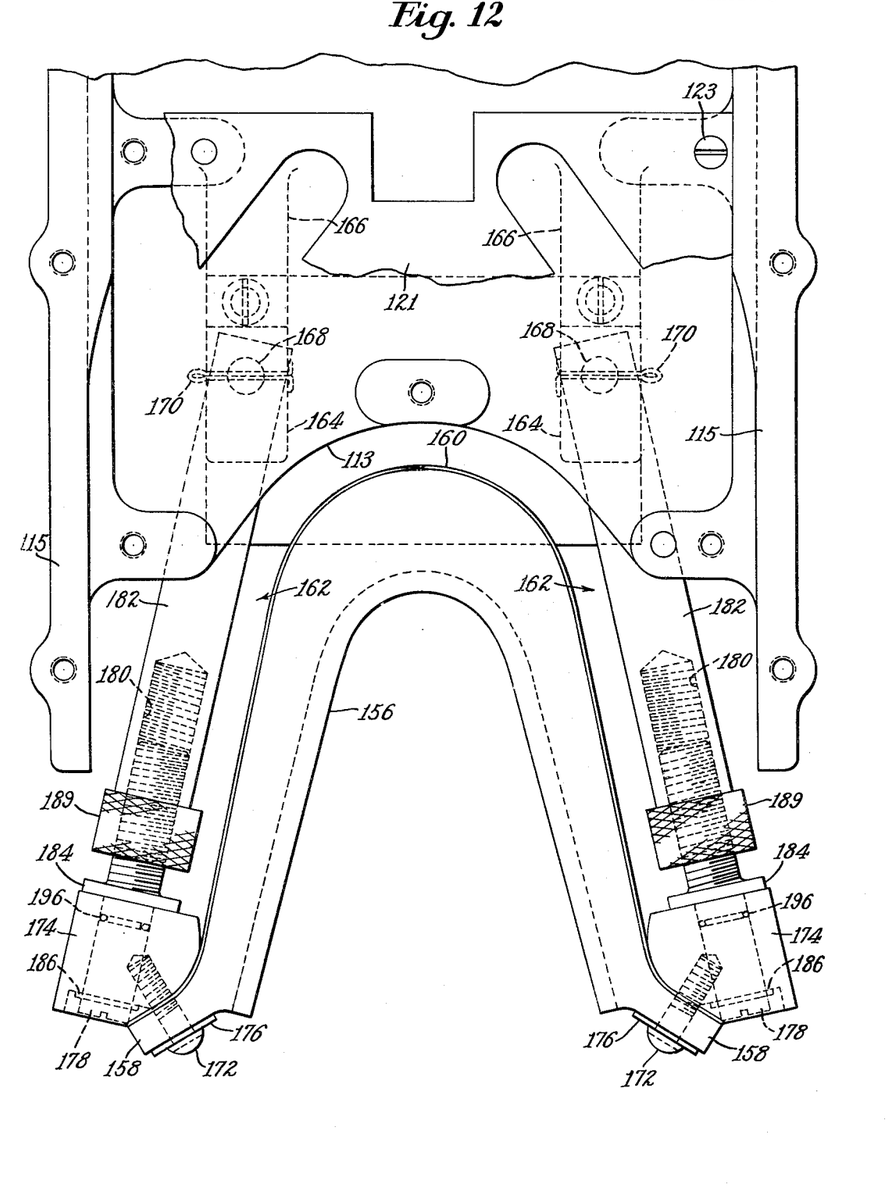
FIG. 12 is a plan view illustrating on a large scale the heel band mechanism incorporated in the organization in station A.
Figure 13:
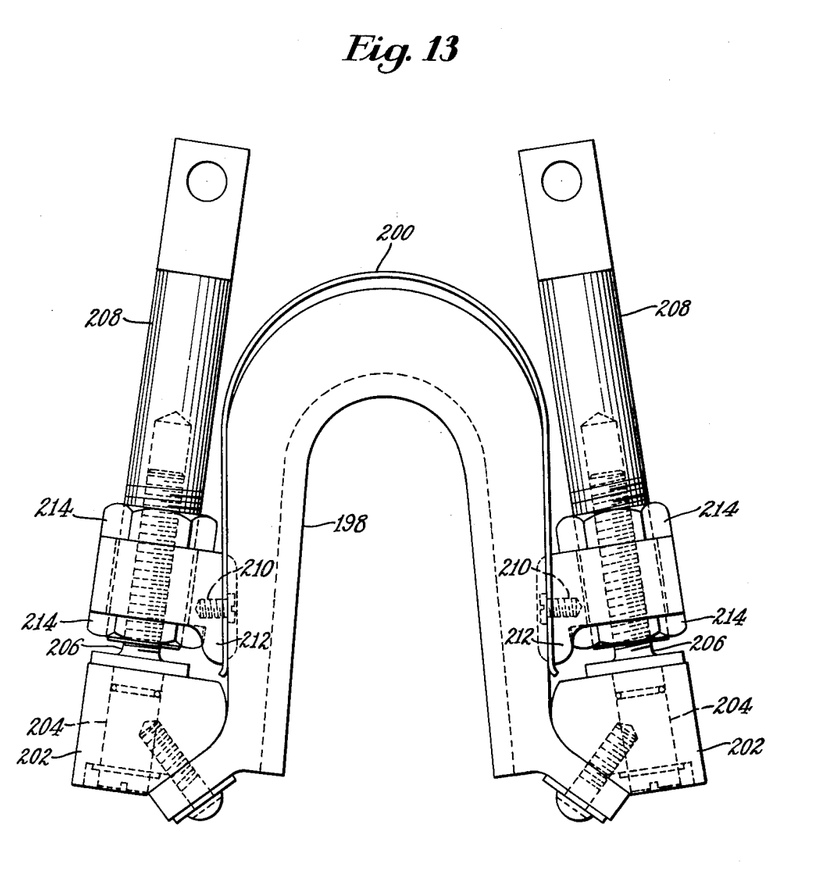
FIG. 13 is a plan view on the same scale as FIG. 12 illustrating an alternative heel band mechanism.

For shaping or molding the heel end portions of upper materials upon a last in the machine the present invention provides two alternative heel band assemblies one of which is illustrated in FIG. 12 and the other in FIG. 13. In each of these assemblies the heel band is charged with conducting means, such for example as aluminum powder, for conducting heat from the upper materials, and particularly from a thermoplastic heel stiffener or counter incorporated in the upper materials, thereby to cause the stiffener to set to the shape of the heel end portion of the last. Referring to the assembly illustrated in FIG. 12, a resilient band 156 is molded of any suitable plastic material such, for example, as rubber, the inner surface of the band having a contour complemental to the contour of the heel end portion of a last and the outer surface being arcuate in shape at its rear end and having plane side faces tangential to the arcuate end portion. To provide for the attachment of the band to its mounting means, the opposite end portions of the band have flanges 158 extending forwardly and outwardly therefrom. The rear portion of the band is substantially thicker than the side portions and is made of a substantially lower durometer rubber than the side portions so that the rear portion will compress when the band is brought forcibly against the shoe upper materials on the last, thus permitting the opposite side portions of the band to move toewardly after they come in contact with the outermost of the upper materials. The material of the rear portion of the band is approximately 65 durometer in the A scale and the opposite side portions are approximately 90 durameter. By reason of the frictional contact of the side portions of the band with the upper, the toeward movement of the band causes the side portions thereof to tension the opposite sides of the heel portion of the upper toewardly, thus bringing the upper materials into intimate contact with the last and eliminating any wrinkles which may exist in the outermost of the upper materials. A resilient steel band 160 arranged in contiguous relation to the band 156 throughout its entire length prevents any stretching action of the band and limits the toeward movement of the band to that degree of movement afforded by the compression of the back part of the band when it is advanced forcibly against the upper materials at the heel end of the last. The forward movement afforded by the compression of the back part of the band illustrated in FIG. 12 is approximately ⅜". This degree of movement of the opposite sides of the heel band has been found sufficient to cause the elimination of any wrinkles existing in the heel end portion of the upper. The heel band is carried by a pair of arms 162 which in their normal disposition, when the machine is at rest, converge rearwardly as shown in FIG. 12. Referring to FIG. 6, the arms 162 are arranged in contiguous relation to the bottom surface of the heel band carriage 114 and are maintained in this position by inserting their rearward end portions between the bottom surface of the carriage and the upper surface of a lug 164 extending forwardly from a boss 166 formed in the base of the carriage. To provide for their pivotal mounting, each arm is drilled at its rear end portion to receive a pin 168 extending through a bore in the lug 164 and into a socket in the carriage and held in position by a cotter pin 170. To provide for the adjustment of the heel band toward and from the heel portion of a last in the machine, the composite arms illustrated in FIG. 12 are extensible. In the organization illustrated in FIG. 12, the flanges 158 at the forward extremities of the heel band are secured by headed screws 172 to swivel blocks 174, said screws extending through suitable apertures in clamping plates 176 (FIG. 12), then through apertures in the flanges 158 and finally through suitable apertures in the steel band 160 and into threaded sockets provided in the swivel blocks. Each block has its inner surface shaped for intimate contact with the concave end portion of the steel band 160 to which it is secured by the screws 172 and the block is bored for swiveling engagement on the cylindrical head of a screw 178 mounted in a threaded socket 180 formed in the rear portion 182 of the composite arm. The swivel block 174 is seated against a flange 184 formed in the screw 178 and is held against the flange by a spring clip 186 mounted in a peripheral groove in the head of the screw. The screw is secured in adjusted position by a knurled cylindrical lock nut 189 mounted thereon and arranged to engage the forward end of the arm 182. In order to resist movement of the block 174 upon the pin 178 the pin is provided with a peripheral groove at a point adjacent to the flange 184 to receive a rubber O-ring 196 which is compressed between the groove and the wall of the bore in the block 174.

In the heel band organization illustrated in FIG. 13, a band 198 having a shape substantially similar to the band 156 illustrated in FIG. 12 is constructed of a material sufficiently elastic to permit the band to stretch from its dimensions indicated in FIG. 13 until the rear portion of the band is engaged by a steel strap or band 200 which is normally spaced from the rear portion of the band as shown in FIG. 13. The band 198 is secured to two swivel blocks 202 in the same manner as the band 156 and each of the swivel blocks is mounted on a screw 204 in the same manner as the swivel blocks 174 in FIG. 12. In the organization illustrated in FIG. 13 as in the organization in FIG. 12, the adjustment of the heel band toward and from the heel end of the last is effected by turning the screw so as to adjust its threaded stem 206 endwise of the arm 208 in which it is mounted. The steel band 200 has its opposite end portions secured by flat headed screws 210 to a pair of blocks 212. Each block is bored to receive the cylindrical forward portion of the arm 208 and the arm is threaded to receive two clamping nuts 214 which secure the block in adjusted position on the arm. In the operation of the heel band 198 the band is advanced in its slightly outspread position illustrated in FIG. 13 until the arcuate portion of the band engages the extremity of the heel portion of a shoe on the last pin 20. Continued advancement of the band carriage thereafter causes the opposite side portions of the band to move toward each other and into pressing engagement with the opposite sides of the heel portion of the shoe while the band stretches to the extent permitted by the adjusted position of the steel band 200. During at least a part of the stretching action of the band, its inner surface is in frictional contact with the opposite sides of the heel portion of the upper exerting a tensioning action on the heel end portion of the upper in a toeward direction, thereby to bring the upper materials into intimate contact with the last and to exert a drawing or tensioning action on the upper calculated to eliminate any wrinkles or irregularities therein, and to cause the upper to assume a smooth condition during the molding or shaping thereof to the heel end portion of the last. It will be understood that the tensioning action of the band on the upper occurs progressively as the opposite side portions of the band are brought into engagement with the heel end portion of the upper.

Figure 5:
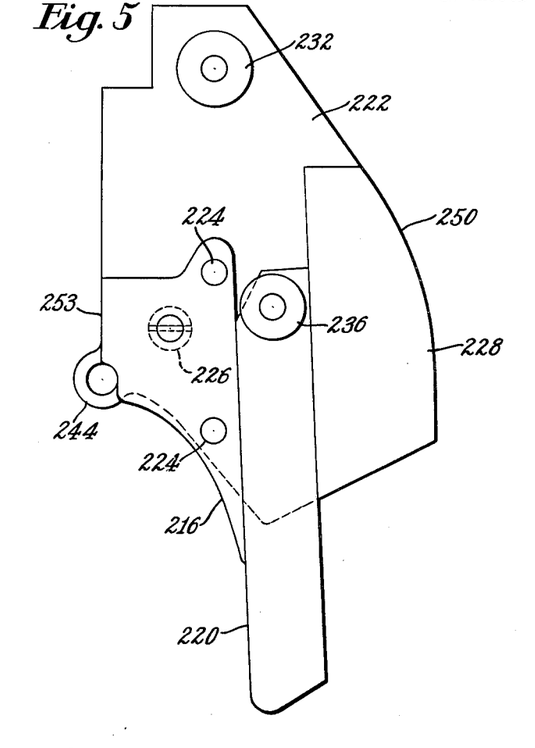
FIG. 5 is an enlarged bottom view illustrating the left-hand wiper assembly in FIG. 4.
Figure 7:
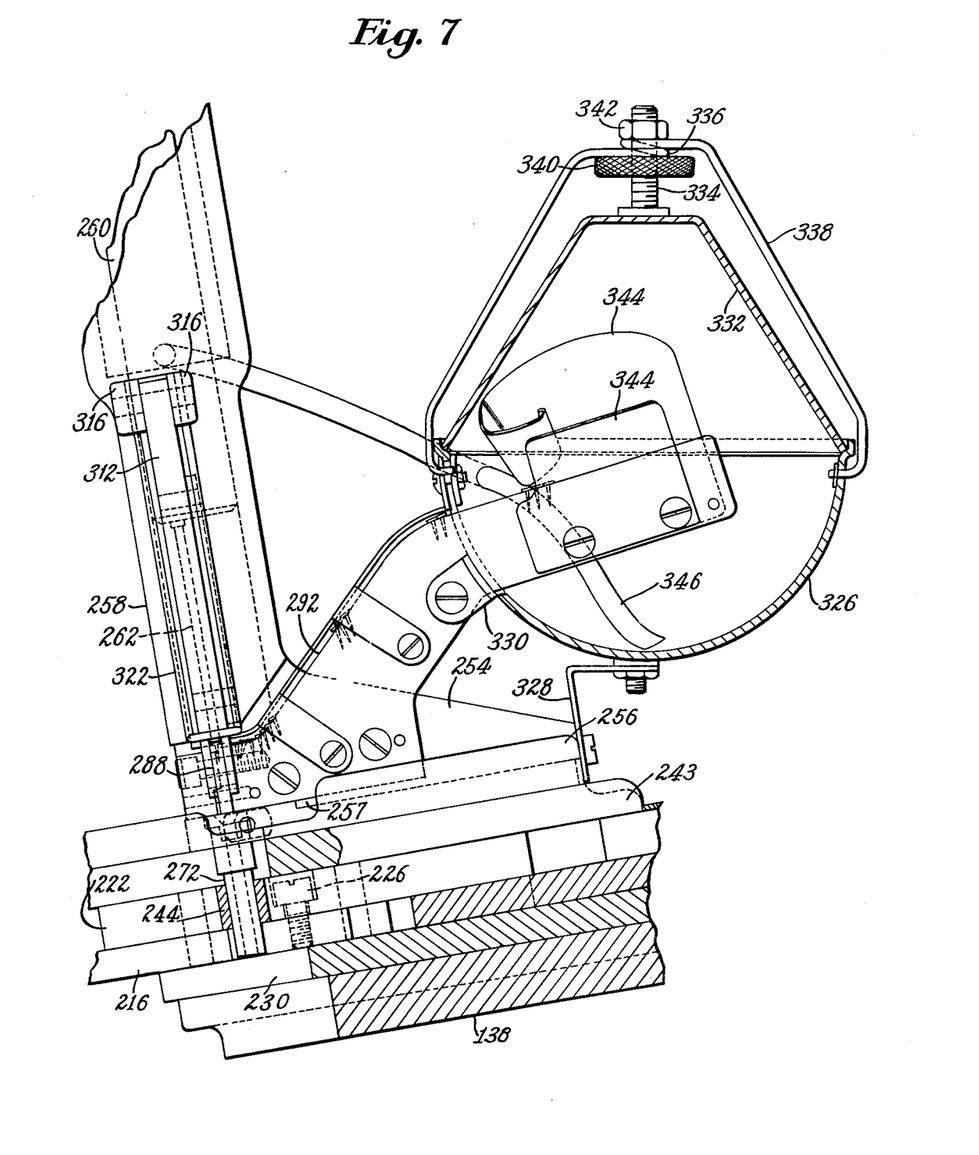
FIG. 7 is a right side elevation illustrating the tack supplying and driving mechanism in station A, certain parts being shown in section on a plane common to the axis of the tack driver nozzle.

For wiping the lasting margins of the shoe upper materials at the heel end of the upper inwardly over an insole on the last bottom the illustrated machine is provided with a lasting organization illustrated in FIGS. 4, 5 and 7. For overwiping the extremity of the heel portion of the upper materials, two wiper plates 216 and 218 are provided, and for overwiping opposite sides of the heel end portions of the upper materials, two rectilinear wiper plates 220 are arranged in contiguous relation to the end wipers 216 and 218, respectively. Referring to FIG. 5, the end wiper 216 is mounted on the bottom surface of a wiper carrier plate 222. The wiper is registered relatively to the carrier by two dowel pins 224 mounted in the carrier and arranged to be received in suitable bores provided in the wiper plate. A headed screw 226 removably secures the wiper to the carrier. The side wiper 220 illustrated in FIG. 5 is freely mounted for rectilinear movement between the rectilinear edge face of the wiper plate 216 and the rectilinear wall of a land 228 formed in the wiper carrier. The side wiper 220 is vertically confined between the bottom surface of the wiper carrier 222 and the upper surface of a cam plate 121 (FIGS. 4 and 12) overlying the base portion 113 of the heel band carriage. The cam plate is secured by screws 123 to bosses 125 formed in the base portion 113. The wiper carrier 222 carries at its rear end a roll 232 which travels in an angular slot 234 formed in the cam plate 121, and the side wiper 220 carries at its rear end a roll 236 which travels in an angular slot 238 formed in the cam plate. The slot 234 is so arranged that the wiper 216 receives a movement of translation toewardly during its closing movement and the slot 238 is so arranged that the side wiper 220 moves inwardly over the shoe bottom with little, if any, movement lengthwise of the shoe. The wiper carrier 222 also carries a roll 240 (FIG. 4) which is positioned in a slot 242 formed in the wiper actuating slide 138. The construction and arrangement of the right hand wiper assembly illustrated in FIG. 4 will be understood from the foregoing description. The wiper assemblies are retained in position against the upward pressure exerted against the wipers in the overwiping operation by a cover plate 243 secured to the side members 115 of the heel band carriage by screws 245. A similar cover plate 247 is secured to the rear portions of the side members 115 by screws 249. The end wipers 216 and 218 in the course of their wiping movement swing in a horizontal plane about a common axis provided by a halved joint structure now to be described. The wiper carrier 222 has an arcuate extension 244 which registers with a complementally shaped edge face 246 formed in the wiper carrier 223. In order to maintain constant articulation of the end wiper plates at their halved joint the outer edge faces 250 of the wiper carriers, at their forward extremities, are in the form of an arc struck from the common axis of angular movement of the wipers 216 and 218 and said arcuate edge faces bear against walls 252 formed in the side members 115 of the heel band carriage.

In the wiping operation the heel end wipers 216 and 218 receive angular movement as hereinbefore described thus advancing their wiping edges toward each other with a consequent separation of their rectilinear edges 253 which as shown in FIG. 4, are contiguous to each other when the wipers are in their retracted position. The separation of the edges 253 during the overwiping operation exposes a triangular area of the overlasted margin of the upper in the region of the back seam. In order that this area will be subjected to adequate wiping pressure an additional wiping means is provided in the form of a wedge structure 255 formed in and projecting forwardly from the central portion of the wiper actuating slide 138. This wedge structure is so constructed and arranged that it engages the rectilinear edges 253 of the wipers 216 and 218 as the slide comes to the limit of its advancement and thus overwipes the area of the upper exposed by the angular closing movement of the wipers 216 and 218.

Figures 8, 9, 10, 11:
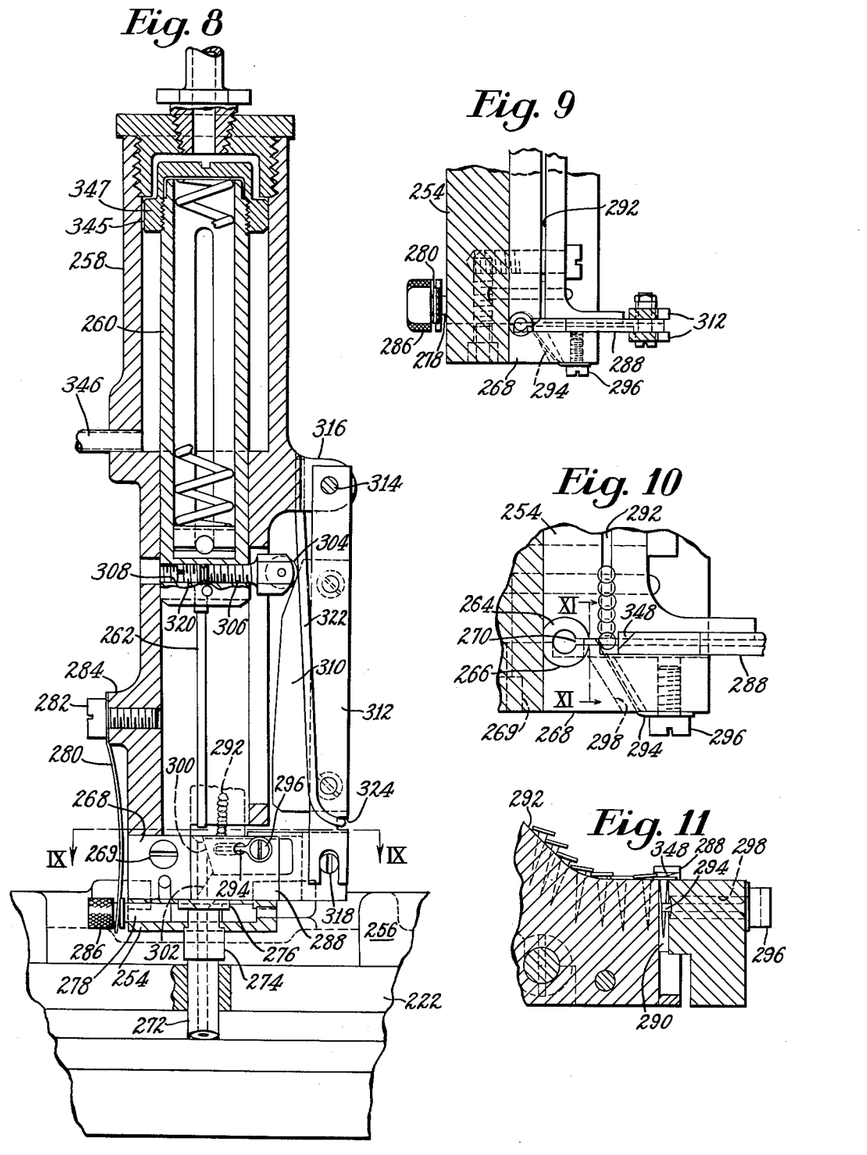
FIG. 8 is a front elevation illustrating the tack driving assembly shown in FIG. 7, partly in section on a plane common to the axis of the tack driver cylinder.
FIG. 9 is an enlarged section taken substantially on the line IX—IX of FIG. 8.
FIG. 10 is a section taken on the same plane as FIG. 9 but on a substantially larger scale than FIG. 9.
FIG. 11 is a section taken on the line XI—XI of FIG. 10.

The tack driving means illustrated generally in FIG. 2 and identified by the numeral 154 is further illustrated in FIGS. 7 and 8. Referring to FIG. 7, the illustrated tack driving organization comprises a base 254 slidably mounted between parallel flanges 256 extending upwardly from the cover plate 243, suitable tongues 257 being formed in the base for sliding engagement in grooves in the flanges 256. Mounted on the base 254 and extending upwardly at a right angle thereto is a cylinder 258 in which is mounted a piston 260 which carries at its lower end a tack driving pin 262. The pin drives a tack through an aperture comprising a semicylindrical structure 264 (FIG. 10) formed in the base 254 and a semicylindrical structure 266 formed in a block 268 removably secured to the base 254 by a headed screw 269. The meeting faces of the parts are cut back, as shown in FIG. 10, sufficiently to provide a passage 270 through which tacks are fed one at a time into the aperture provided by said semicylindrical structures. The aperture communicates with a headed tubular member or nozzle 272 through which the tack is driven to secure the overlasted upper materials at the extremity of the heel end of a shoe mounted on a last in the machine to an insole on the last bottom. As shown in FIG. 8, the head 274 of the tubular member 272 has at its upper extremity a circular flange 276 whereby the nozzle is supported in a T way in the base 254. A tapered pin 278 clamps the nozzle against the forward end of the T way and thus retains it in its position illustrated in FIG. 8. The pin 278 is mounted in a horizontal bore in the base 254 and is retained therein by a spring 280 secured at its upper end by a headed screw 282 to a boss 284 projecting outwardly from the cylinder 258. At its lower end the spring 280 is bifurcated for engagement in a peripheral groove formed in a knurled head 286 of the pin 278. For feeding tacks into the aperture formed by the semicylindrical structures 264 and 266, a slide 288 is mounted for horizontal movement in the way 270 between the block 268 and the base 254, the slide being supported by outwardly extending flanges which engage the block and base, respectively. The slide engages a leading tack located at a transfer point at the junction of the way 270 and a raceway 292 and advances the tack from the transfer point to the aperture. For restricting the flow of tacks through the raceway and positioning the leading tack at the transfer point for engagement by the slide 288, a spring finger 294 is secured to the block 268 by a headed screw 296. As shown in FIG. 10, the spring finger is bent so as to be positioned in an oversized bore 298 extending angularly through the block 268, the end portion of the spring being arranged yieldingly to retain the leading tack at the transfer point for engagement by the slide 288. The leading portion of the slide 288, as shown in FIG. 8, has an upper end wall 300 which is cut back slightly to provide a picker which takes the leading tack and advances it into the aperture. The leading end portion of the slide has a lower end wall 302 which is inclined forwardly to provide suitable means for retaining a tack within the aperture. The tack driver is operated with explosive force by compressed air developed in an accumulator (not shown). During the first stage of the advancement of the tack driver the slide 288 is retracted by means of a roll 304 mounted in the bifurcated head of a screw 306 mounted in a threaded bore 308 in the lower portion of the piston 260. The roll 304 acts on a cam plate 310 secured to a lever 312 fulcrumed at 314 between ears 316 projecting outwardly from the cylinder 258. As shown in FIG. 9, the lower portion of the lever 312 is bifurcated to straddle the slide 288 and each section of the lower portion of the lever is bifurcated as shown in FIG. 8 to engage a bolt 318 carried by the slide. The roll 304 operates the lever 312 during the downward or driving movement of the tack driver to move the slide 288 to the right so that the bottom of the aperture is opened at the instant the tack driver hits the head of the tack. In order to obtain the desired time relation between the retraction of the slide 288 and the advancement of the tack driver, the screw 306 is adjustable in the bore 308. For securing the screw in adjusted position, a set screw 320 is mounted in the bore 308 for engagement with the end of the screw 306. For advancing the slide 288 into its position illustrated in FIG. 8, a hairpin spring 322 (FIG. 8) is arranged with its bent portion curved outwardly and seated in slots 324 formed in the lever 312 and its end portions inserted into bores formed in the ears 316. Tacks are fed to the raceway 292 from a hemispherical pot 326 (FIG. 7) secured to a bracket 328 fixed to the base 254 and to a bracket 330 on the raceway 292. A cover 332 in the form of a truncated cone is provided for the tack pot and is clamped to the pot by a flat headed screw 334 which extends upwardly through a coil 336 formed in a bail 338 hooked into suitable apertures formed in the pot. A knurled nut 340 mounted on the screw 334 and positioned between the head of the screw and the coil 336 provides means for applying clamping pressure to the screw 334, and a nut 342 mounted on the screw above the coil 336 serves as a locking means for the knurled nut 340. The raceway 292 extends into the tack pot through a suitable opening formed therein and is provided with chutes 344 for conducting to the raceway tacks elevated into the cover 332 by a current of air delivered through a tube 346 extending from the cylinder 258 to the tack pot 326. Air is supplied to the tube 346 from a supply line communicating with the cylinder 258 and to that end a small aperture or groove 345 is formed in the outer surface of a washer 347 surrounding the piston 260, thus providing a flow of air from the accumulator through the cylinder and the tube 346.

It has been found that the leading tack traveling down the raceway 292 (FIG. 11) may be so disposed in the raceway that the leading portion of the head of the tack will come in contact with the farther wall of the passage 270, thus preventing the tack from assuming its position illustrated in FIG. 11 at the transfer point. In order to obviate such an occurrence the leading right-hand corner portion of the upper surface of the slide 288 is angularly beveled at 348 as shown in FIGS. 10 and 11 so that as it advances the leading tack toward the aperture the beveled corner portion 348 of the slide moves under the head of the second tack and elevates it into a position in which it is supported by the top of the slide. When the slide 288 is retracted by the operation of the driver the elevated tack, which is then the leading tack in the raceway, will advance into the transfer point as shown in FIG. 11, and because of its elevation by the slide 288 the advancement of the tack will not be interrupted by the engagement of the leading portion of the head of the tack with the farther wall of the passage, but the leading tack will invariably advance to the transfer point shown in FIG. 11. In this position it is properly located for its advancement through the passage 270 and into the aperture by the operation of the slide 288.

Referring to FIG. 7, the nozzle 272 extends through an aperture at the axis of the arcuate extension 244 of the wiper carrier 222 and through suitable recesses formed in the wiper plates, and its bottom end face is slightly beveled to provide a wiping surface which cooperates with the wipers to wipe the back line portions of the upper materials inwardly over an insole on the last bottom. In the operation of the wiper actuating slide the nozzle 272 is moved bodily to the left, as seen in FIG. 7, by the wiper carrier 222 carrying with it the tack driving assembly. Thus the tack driving assembly comes to rest at the end of the wiping operation in an appropriate position for the driving of a tack to secure the overlasted upper materials to an insole on the last bottom.

Figure 14:
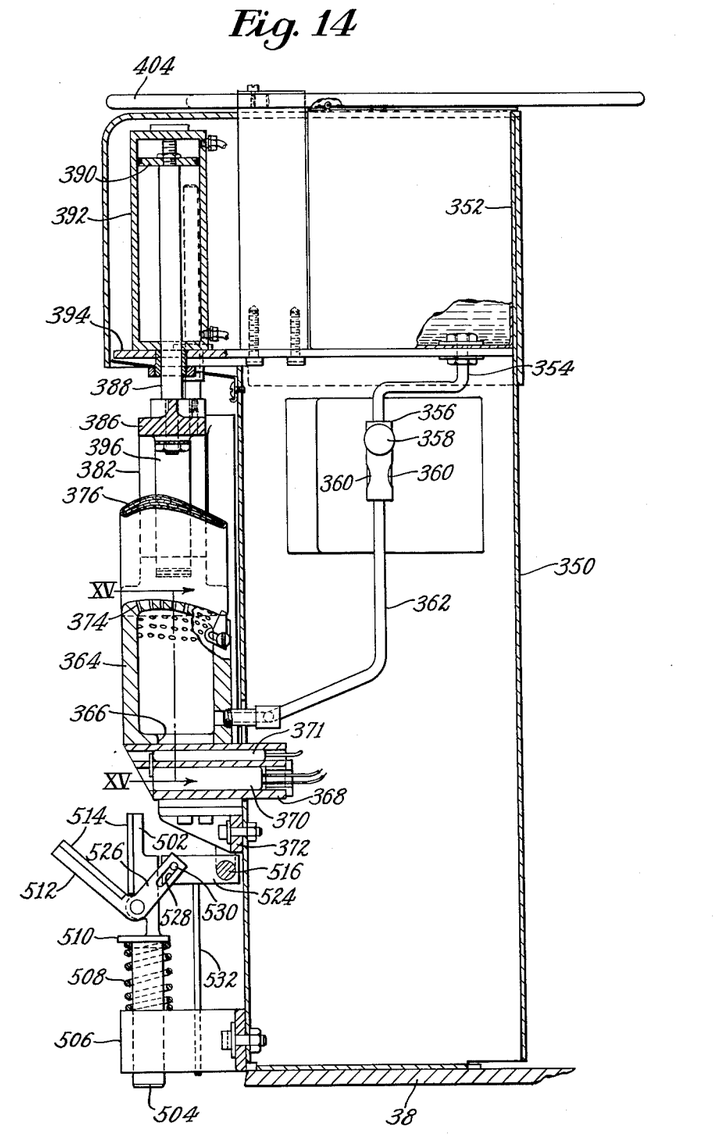
FIG. 14 is an enlarged side elevation of the organization in station B partly in section on the vertical axis of the heel form.
Figure 15:
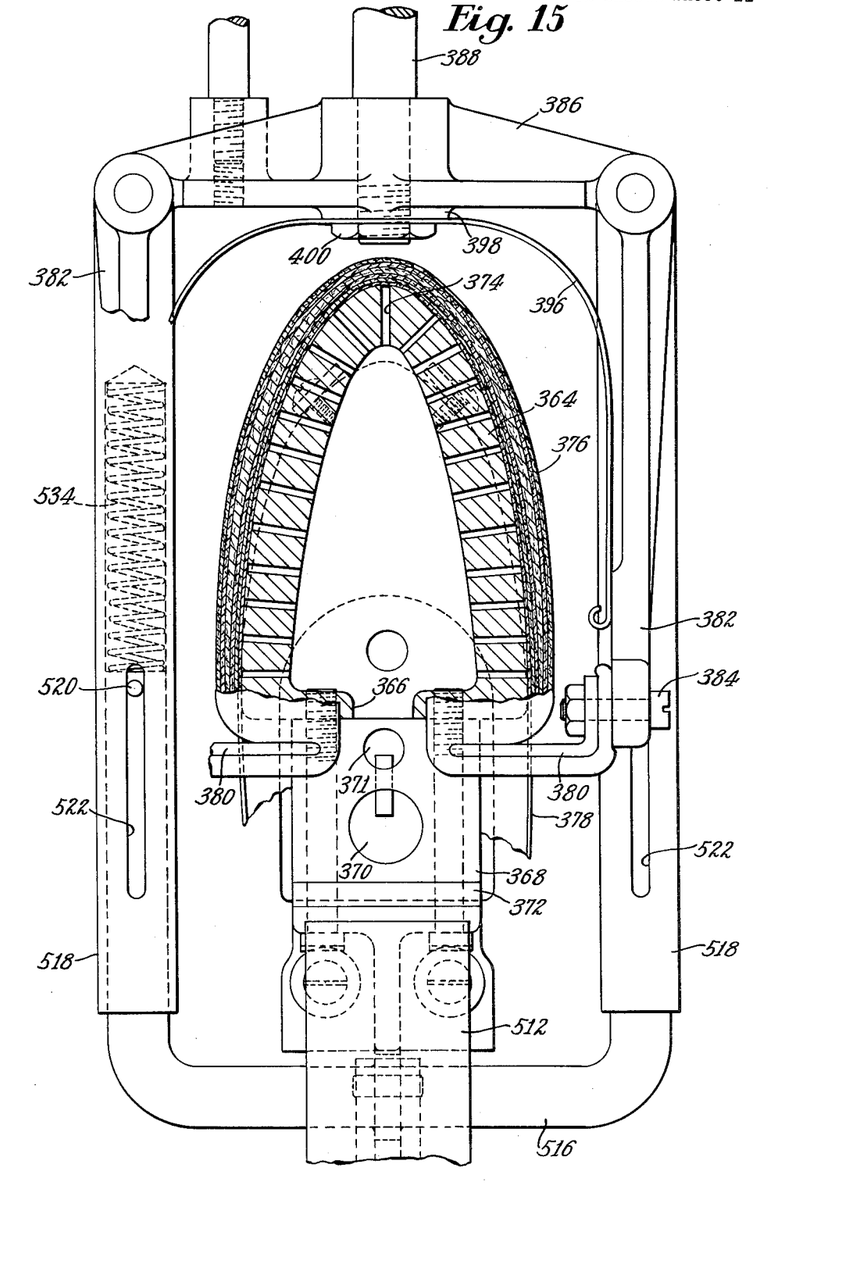
FIG. 15 is a greatly enlarged front elevation illustrating certain parts shown in FIG. 14, partly in section on the line XV—XV of FIG. 14.

For transmitting heat to a thermoplastic counter to render it flaccid for the period of the molding operation performed in station A or station C there is provided in station B a heat dispensing organization illustrated in FIGS. 14 and 15. This organization comprises a housing 350 upstanding on the cabinet 38 and having mounted at its upper extremity a superstructure in which is secured a tank 352 containing water at room temperature. Water is conducted from the bottom of the tank through a tube 354 to a cylinder 356 having in its upper portion a needle valve controlled by a knob 358 and in its lower portion a glass visible through either of two ports 360 for observation of the flow of water from the needle valve. Preferably the needle valve is so adjusted that water flows therefrom in drops. Water flows from the cylinder 356 through a tube 362 into a hollow metal form 364 having the shape of the heel end portion of a shoe last. After entering the form, water flows down through an opening 366 in the base of the form and onto the upper surface of a casing 368 which mounts an electrically heated cartridge 370 and a thermostat 371 for regulating the cartridge. The assembly comprising the form 364 and the casing 368 is supported on a shelf 372 secured to the front wall of the housing 350. The cartridge 370 heats the casing 368 and the form 364 to a temperature appropriate for the treatment of the type of stiffener material being used, usually between 250° and 400° F., and converts the water which comes in contact with the casing 368 to super-heated steam which moves upwardly into the chamber in the form 364 and outwardly through ports formed in the peripheral wall of the form, one of said ports being identified in FIG. 14 by the numeral 374. The steam transmitted through the ports in the form 364 passes through the quarter lining of a shoe upper mounted on the form and into contact with a stiffener or counter mounted in the upper. The steam passing through the apertures in the form not only transmits heat through the quarter lining to the counter material but also provides a fluid condensation on the shoe upper materials which accelerates the transmission of radiant heat from the form 364 into the shoe upper materials. In order to obviate the occurrence of entrapped air between the quarter lining and the form 364 and to cause the lining to be brought into intimate contact with the outer surface of the form throughout the entire extent of its peripheral surface a band 376 of leather or other suitable flexible material is molded to give it a shape complemental to the contour of the form 364 and is arranged to be moved downwardly from its elevated and outspread position illustrated in FIG. 1 into its position illustrated in FIG. 15 in which it has been brought to bear against the outer surface of the heel end portion of a shoe upper 378 mounted on the form 364. As shown in FIG. 15 the opposite end portions of the band 376 are wrapped around angle brackets 380 and the extremities of the band are clamped between the brackets and the free end portions of a pair of arms 382 by bolts 384. The inner edges of the brackets 380 are shaped to a contour complemental to the contour of the lower extremities of the peripheral surface of the form 364 thereby to cause the band 376 by downward and inward movement of the arms 382 to bring the upper into intimate contact with the peripheral surface of the form throughout its entire extent. The arms 382 are hinged at the outer extremities of a cross head 386 secured to the lower portion of a piston rod 388. Referring to FIG. 14 the rod 388 carries at its upper end a head 390 which operates in a cylinder 392 fixed to and upstanding on a plate 394 mounted at the upper extremity of the housing 350. For returning the band 376 to its outspread position illustrated in FIG. 1 during its upward or retracting movement a spring plate 396 (FIG. 15) is flexed into the form of an inverted U with its end portions bearing respectively against the lower end portions of the arms 382. The spring plate is secured to a boss 398 extending downwardly from the crosshead 386 by a clamping nut 400 mounted on the threaded end portion of the piston rod 388. Referring to FIG. 1 the superstructure 402 on the housing 350 has mounted at its upper extremity two brackets in the form of bent rods 404 arranged to support shoe uppers in a position convenient for transfer by the operator to the form 364. During the heating of the upper on the form 364 toeward tension is imparted to the upper by means now to be described in order to cause the heel portions of the upper materials to be drawn smoothly and in a wrinklefree condition into contact with the peripheral surface of the form 364. Referring to FIG. 14, a vertical gripper jaw 502 extends upwardly from a shaft 504 slidably mounted in a bearing in a bracket 506 secured to the housing 350. The jaw is yieldingly supported against downward movement by a spring 508 surrounding the shaft 504 and confined between the bracket 506 and a flange 510 at the upper extremity of the shaft. Hinged at the base of the jaw 502 for closing movement relatively thereto is a jaw 512. The jaws have bonded thereto gripping elements 514 made of any suitable resilient material. The closing of the jaws on the toe portion of a shoe upper depending from the form 364 is effected by the downward movement of the cross head 386 (FIG. 15). To this end a U-shaped cylindrical bar 516 is arranged with its end portions upstanding as shown in FIG. 15 and slidably mounted in the lower portions of tubular members 518 depending from the cross head. The movement of the bar 516 endwise of the tubular members is limited by pins 520 projecting radially forwardly from the upper extremities of the bar 516 through longitudinal slots 522 formed in the tubular members. Referring to FIG. 14, the horizontal portion of the bar 516 is fixed in a block 524 which is straddled by a pair of arms 526 projecting from the base of the jaw 512 at right angles thereto. Slots 528 formed in the arms 526 receive the projecting ends of a cross-pin 530 mounted in the block 524. The downward movement of the block 524 is guided by a pin 532 fixed in the block and extending downwardly therefrom for sliding engagement in a bore formed in the bracket 506. Referring to FIG. 15, the downward movement of the cross head 386 is imparted to the bar 516 through suitable springs 534 mounted in the tubular members 518 and bearing against the upper end faces of the bar 516.

Figure 16:
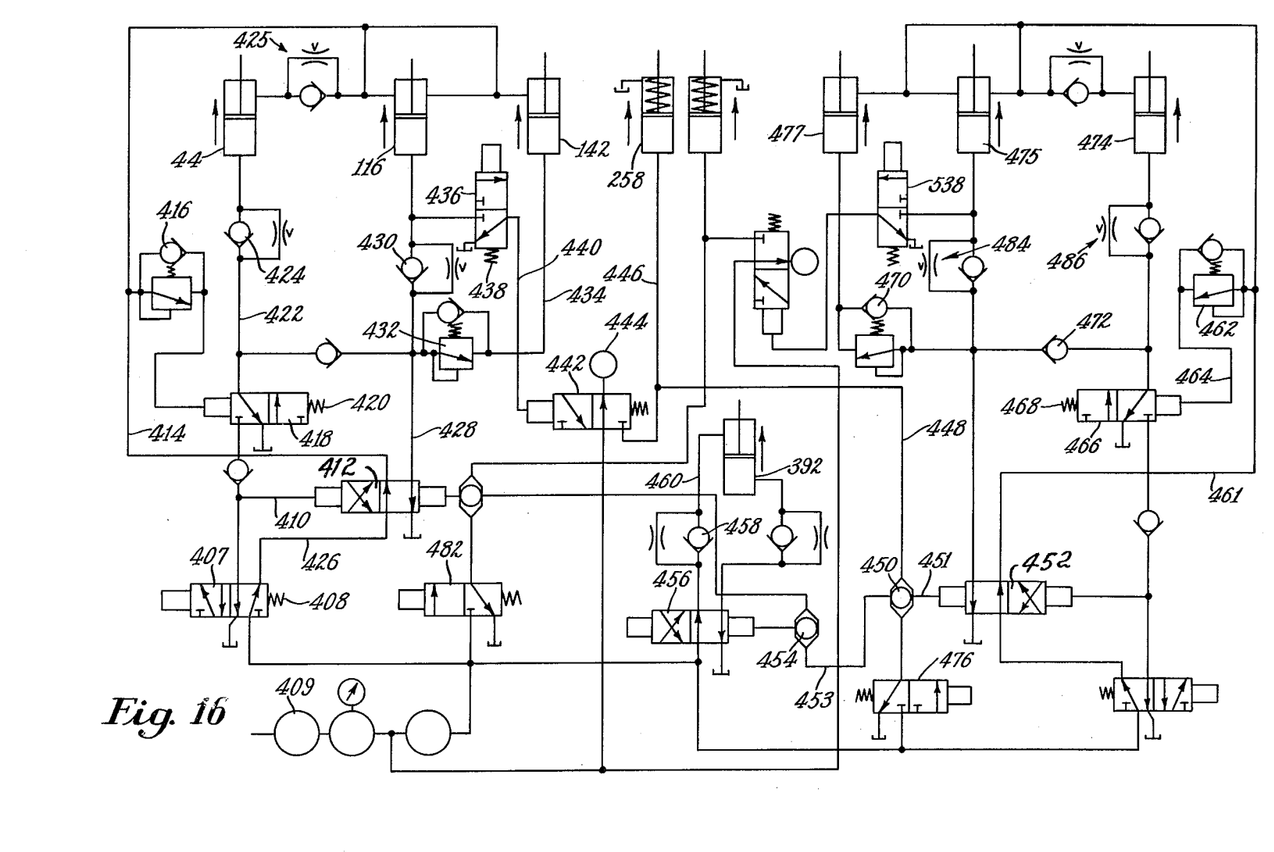
FIG. 16 is a diagrammatic view of a pneumatic valve assembly for controlling the operation of all three stations of the machine.

The cycle in station A is initiated by the depression of a foot treadle 406 (FIG. 1). Referring to FIG. 16, the depression of the treadle moves a valve 407 to the right as seen in said figure against the pressure of a spring 408, thus opening to pressure from a source 409 a line 410 leading to the pilot at the left side of a valve 412. Thus the valve 412 is moved to the right opening to exhaust a line 414 which communicates through a ball check valve 416 with the pilot at the left side of a valve 418 thus permitting a spring 420 at the right side of the valve to move the valve to the left, thus opening to pressure a line 422 communicating through a ball check valve 424 with the jack operating piston 44. Thus a last mounted on the last pin 20 (FIG. 1) is moved upwardly into a position determined by the engagement of an insole on the last bottom with the holddown 48. Such upward movement of the last is controlled by a variable restriction 425 on the exhaust side of the piston 44. After checking the position of the shoe upper parts on the last and making any necessary adjustments, the operator releases the treadle 406 whereupon the spring 408 returns the valve 407 to its position illustrated in FIG. 16 to cause a line 426 from the valve 407 to the valve 412 to be pressurized as is also a line 428 leading from the valve 412 through a ball check valve 430 to the heel band cylinder 116. After the heel band comes into engagement with the heel portion of a shoe upper on the last, pressure builds up in the system to a degree sufficient to operate a sequence valve 432 which opens a line to the wiper cylinder 142. As the wiper operating slide 138 approaches the end of its advancing movement the valve 436 carried thereby is mechanically shifted as hereinafter described, the movement of the valve being downward as seen in FIG. 16 against the pressure of a spring 438. The mechanical operation of the valve 436 opens to pressure a line 440 leading from said valve to a pilot at the left side of a valve 442. Thus the valve 442 is moved to the right thereby opening to the pressure of an accumulator 444 a line 446 communicating with the tack driving cylinder 258. Compressed air from the accumulator also flows through the cylinder 258 and the tube 346 (FIG. 7) to agitate the tacks in the pot 326. The accumulator 444 also pressurizes a line 448 communicating with a shuttle valve 450. The operation of the shuttle valve opens to pressure a line 451 communicating with a pilot at the left side of a valve 452 and opens to pressure a line 453 communicating through a shuttle valve 454 with a pilot at the right side of a valve 456, moving said valve to the left into its position illustrated in FIG. 16, thus opening to pressure a line communicating through a ball check valve 458 and a line 460 with the lower extremity of the cylinder 392 (FIG. 14), thus elevating the piston 390 and retracting the heel band 376 into its position illustrated in FIG. 14. The operation of valve 452 as above described opens to pressure a line 461 communicating with the jack cylinder 474, the heel band cylinder 475 and the wiper operating cylinder 477 in station C. Thereupon pressure builds up in the system sufficiently to operate a sequence valve 462 thereby pressurizing a line 464 communicating with a pilot at the right side of a valve 466 and moving said valve to the left against the pressure of a spring 468. The operation of the valve 466 connects the cylinder 477 to exhaust through the two ball valves 470 and 472, connects the cylinder 475 to exhaust through a variable restriction 484 and the ball valve 472, and connects the jack cylinder 474 to exhaust through a variable restriction 486. Thus, it will be seen that the wipers are retracted with the heel band still closed. The restriction 484 is so adjusted that the band is retracted with the jack still elevated. After the band comes to rest pressure builds up sufficiently to overcome the restriction 486 and then the jack is moved downwardly into its rest position. This terminates the pneumatic cycle with the jack in station A elevated, the wipers advanced and the heel band under pressure.

If desired, the retraction of the jack, the heel band and the wipers can be effected by the manual operation of a valve 476 which opens to pressure a line communicating through the valve 450 with the pilot at the left side of the valve 452. To provide for the convenient operation of the valve 476, a button 478 (FIG. 1) projects through a suitable aperture in the cabinet 38. A similar button 480 is provided for the operation of a valve 482 which performs the same function for station A as the valve 476 performs for station C.

To provide for the mechanical operation of the valve 538, which causes the retraction of the wipers, the heel band and the jack in station C, a cylindrical housing 488 (FIG. 4), in which the valve is mounted, is secured to a plate 490 which is adjustably clamped to the upper surface of the cover plate 247 by the head of the screw 249 which extends through a slot 494 in the plate 490. The valve body extends through a slot (not shown) in the cover plate and the portion of the valve body beneath the cover plate has an arm 496 extending rearwardly therefrom and providing a fulcrum for a level 498 which is bifurcated at its forward end portion for the mounting of a roll 500. In the operation of the wiper operation slide 138 the block 153 fixed to the slide engages the roll 500 thereby swinging the lever 498 upwardly and operating the valve 482.

In the following description of the operation of the illustrative machine let it be assumed that the moulding operation in station A has been completed and the shoe has been removed from the jack and that the shoe in station C is still under pressure. With his left hand the operator removes the heat treated upper from the form 364 in station B and with his right hand the operator takes an upper to be treated from a nest of uppers on the rack 404. The upper to be treated is mounted on the form 364 and the toe end of the upper is inserted between the gripper jaws 502 and 512 (FIG. 14). The operator then depresses a treadle 536 to shift the valve 455 to the right as seen in FIG. 16 and thereby to pressurize the upper portion of the cylinder 392 (FIG. 14) and to cause the operation of the band 376 and the grippers 512 and 502. Thereupon the operator takes the appropriate last from the last rack and inserts it into the heat treated upper and then mounts the last with the upper thereon on the last pin 20 of the lowered jack in station A. The operator then depresses the treadle 406 to cause the shoe to be moved upwardly into contact with the hold down member 48. After the shoe is jacked against the hold down member the machine comes to rest and the operator adjusts the shoe relatively to the last as required to locate the upper heightwise of the last and also adjusts it about periphery of the heel portion of the last to locate the back seam in proper relation to the extremity of the last. Thereupon the operator releases the treadle 406 thus permitting return of the valve 407 to its position illustrated in FIG. 16 by the spring 408. Thereupon the heel band 156 in station A advances to shape the heel end portion of the shoe upon the last and while the heel band holds the upper firmly against the last the wipers advance and wipe the lasting margins of the shoe upper materials inwardly over an insole of the last bottom. Upon the completion of the wiping operation a tack is driven to secure the overwiped materials at the back line to the insole. The operating assembly in station A then comes to rest with the shoe under the pressure of the heel band and the wipers and remains at rest until it is released by the mechanical operation of the valve 436 by the advancement of the wipers in station C. While the shoe remains under pressure in station A the cycle of operations above described is repeated in station C.

Having thus described my invention what I claim as new and desire to secure by Letters Patent of the United States is:

1. A shoe shaping machine having in a first station a heated shoe form for conditioning a thermoplastic stiffener assembled with shoe upper materials and a band for clamping the upper materials including the stiffener against the heated shoe form thereby to render the stiffener flaccid for the duration of a shaping operation, and having in a second station a band for clamping the upper materials including the stiffener against a shoe last and for conducting heat from the stiffener to permit it to set to the shape of the last, said machine being characterized by means in the second station operable to cause the band in the first station to be disengaged from the shoe upper materials mounted on the heated shoe form.

2. A machine for shaping shoe upper materials upon a last having in a first station a heated shoe form for rendering flaccid a thermoplastic stiffener assembled with shoe upper materials and a band for clamping the shoe upper materials against the heated form, and having in a second station a band for clamping the shoe upper materials including the flaccid stiffener against a shoe last and for dissipating heat from the stiffener to permit it to set to the shape of the last, said machine being characterized by a valve operable to cause the band in the first station to be disengaged from the shoe upper materials mounted on the heated shoe form, and means in the second station for operating said valve.

3. A machine for shaping shoe upper materials upon a last having in a first station a heated shoe form for rendering flaccid a thermoplastic stiffener assembled with shoe upper materials, a band for clamping the upper materials against the heated shoe form and means for gripping the upper materials and tensioning them about the heated shoe form, and having in a second station a band for clamping the ends and opposite sides of the heel portions of the shoe upper materials including the flaccid stiffener against a shoe last, and means for effecting the release of the gripping and tensioning means in the first station and the disengagement of the band in the first station from the shoe upper materials mounted on the heated shoe form.

4. A machine for shaping shoe upper materials upon a last having in a first station a heated shoe form for rendering flaccid a thermoplastic stiffener assembled with shoe upper materials, a band for clamping the upper materials against the shoe form and a toe gripper for tensioning the upper materials about the heated shoe form and having in a second station a band for clamping the entire counter portion of the shoe upper materials including the flaccid stiffener against a shoe last, and means for effecting the release of the toe gripper in the first station and the disengagement of the band in the first station from the shoe upper materials mounted on the heated shoe form.

5. In a shoe machine, the combination with means for supporting a last and a shoe upper thereon of a pair of lasting wipers mutually articulated for angular movement relatively to an end portion of the last, an actuator for the wipers, means mounting the actuator for movement in the direction of the length of a last supported in the machine, and fastening inserting means mounted for movement with the wipers and arranged to insert a fastening for securing a lasted marginal portion of the upper to an insole on the last bottom, said fastening inserting means including a driver and a nozzle in which the driver operates, said nozzle extending through a bore in the wipers at the axis of their angular movement and being arranged to provide a part of the wiping means.

6. In a shoe machine, the combination with means for supporting a last and a shoe upper thereon of a pair of lasting wipers mutually articulated for angular movement relatively to an end portion of a last supported in the machine, an actuator for the wipers mounted for movement in the direction of the length of the last, and fastening inserting means mounted for movement with the wipers and arranged to insert a fastening for securing a lasted marginal portion of the upper to an insole on the last bottom, said fastening inserting means including a driver and a nozzle in which the driver operates, said nozzle extending through a bore in the wipers at the axis of their angular movement and providing the only connection between the fastening inserting means and the wipers whereby the movement of the wipers is imparted to the fastening inserting means.

7. In a shoe machine, the combination with means for supporting a last and a shoe upper thereon of a heel band for clamping the heel end portion of a supported upper against the last in position for a lasting operation, a carriage for the heel band, means mounting the carriage for movement toward and from the heel end of a supported last, a pair of lasting wipers mutually articulated for angular movement relatively to an end portion of the last, an actuator for the wipers mounted on the carriage for movement toward and from the heel end of the last, and fastening inserting means mounted for movement with the wipers and arranged to insert a fastening for securing a lasted marginal portion of the upper to an insole on the last bottom, said fastener inserting means including a driver and a nozzle in which the driver operates, said nozzle extending through a bore in the wipers at the axis of their angular movement.

8. In a shoe machine, the combination with end lasting wipers of a composite end embracing band characterized by a portion of relatively high resiliency constructed and arranged to engage the extremity of an end portion of a supported shoe, and portions of relatively low resiliency arranged at opposite sides of said end portion of the supported shoe, and means for urging the band lengthwise of the supported shoe thereby to effect deformation of said portion of high resiliency and to effect movement of the side portions of the band lengthwise of the shoe, such movement of the side portions being proportional to the degree of deformation of said portion of high resiliency.

9. In a shoe machine, the combination with end lasting wipers of a composite end embracing band characterized by a portion of relatively low durometer and relatively great thickness constructed and arranged to engage the extremity of an end portion of a supported shoe, said band having portions of relatively high durometer and relatively small thickness arranged at opposite sides of said end portion of the supported shoe, and means for urging the band lengthwise of the supported shoe thereby to effect deformation of said portion of low durometer and to effect movement of the side portions of the band lengthwise of the shoe, such movement of the side portions being proportional to the degree of deformation of said portion of low durometer.

10. In a shoe machine, the combination with end lasting wipers of a composite end embracing band characterized by a portion of relatively high resiliency constructed and arranged to engage the extremity of an end portion of a supported shoe, said band having portions of relatively low resiliency arranged at opposite sides of said end portion of the supported shoe, a flexible but inextensible backer arranged in contiguous relation to the outer surface of the band and serving to prevent extension of the band, and means for urging the band lengthwise of the supported upper thereby to effect deformation of said portion of high resiliency and to effect movement of the side portions of the band lengthwise of the shoe, such movement of the side portions being proportional to the degree of deformation of said portion of high resiliency.

11. In a shoe machine, the combination with end lasting wipers of a composite end embracing band characterized by a portion of relatively high resiliency constructed and arranged to engage the extremity of an end portion of a supported shoe, said band having portions of relatively low resiliency arranged at opposite sides of said end portion of the supported shoe, and means for urging the band lengthwise of the supported shoe thereby to effect deformation of said portion of high resiliency and to effect movement of the side portions of the band lengthwise of the shoe, such movement of the side portions of the band lengthwise of the shoe being approximately ⅜".

12. In a shoe machine, the combination with wiping means of means constructed and arranged to embrace an end portion of a shoe in the machine and to shape the shoe about a form, said embracing means comprising an elastic band molded to a shape substantially complemental to the shape of the form, a flexible but inextensible band extending about the elastic band but normally spaced therefrom, actuating means for stretching the elastic band about said end portion of the shoe, and means connecting the elastic band and the inextensible band to each other and to the actuating means.

13. In a shoe machine, the combination with wiping means of means constructed and arranged to embrace an end portion of a shoe in the machine and to shape the shoe about a form, said end embracing means comprising an elastic band molded to a shape substantially complemental to the shape of the form and characterized by side portions which are outspread relatively to each other, a flexible but inextensible band extending about the elastic band but normally spaced therefrom, a carriage for the end embracing means, and means for advancing the carriage first to bring the elastic band into contact with the extremity of said end portion of the shoe and thereafter to advance the opposite side portions of the elastic band into contact with the opposite sides of the end portion of the shoe while concomitantly stretching the band to the extent permitted by the spacing of the inextensible band from the elastic band.

14. In a shoe machine, the combination with wiping means of means for fastening overwiped marginal portions of a shoe upper to an insole on a last bottom, said fastening means comprising a tack driver, a raceway through which tacks are conducted to a transfer point, and a slide member for transferring a tack at the transfer point into driving position relatively to the driver, said slide being characterized by a tack retaining surface formed in its leading extremity and arranged to retain a tack in tack driving position ready for the tack driving operation, said slide being characterized by the formation therein of a cam surface for engaging the bottom surface of the head of a tack next in line to the tack at the transfer point thereby to elevate said next in line tack during the advancement of the slide.

15. In an upper shaping machine, a heel form constructed and arranged to receive the heel end portion of a shoe upper, means for heating the form, a band operable to bring the heel end portion of the upper into intimate contact with the form, a gripper constructed and arranged to engage the toe portion of a shoe upper mounted on the heel form, and an actuator for closing the gripper and moving it in a direction to tension the upper about the heel form and for thereafter advancing the band into clamping engagement with the heel end portion of the upper.

16. In an upper shaping machine, a heel form constructed and arranged to receive the heel end portion of a shoe upper, means for heating the form, a band operable to bring the heel end portion of the upper into intimate contact with the form, a gripper constructed and arranged to engage the upper, a pressure fluid operated piston, mechanical connections from the piston to the band for advancing the band and bringing it into intimate contact with the upper, and mechanical connections from the piston to the gripper for closing the gripper and for advancing the closed gripper to tension the upper about the heel form.

References Cited in the file of this patent

UNITED STATES PATENTS

| | | |
|---|---|---|
| 1,582,534 | Parks | Apr. 27, 1926 |
| 2,207,819 | Pratt et al. | July 16, 1940 |
| 2,208,854 | Perri | July 23, 1940 |
| 2,915,765 | Lauretti | Dec. 8, 1959 |
| 2,983,934 | Bertrand | May 16, 1961 |
| 3,038,182 | Woodman | June 12, 1962 |
| 3,051,969 | Kamborian et al. | Sept. 4, 1962 |
| 3,060,468 | Kamborian et al. | Oct. 30, 1962 |